UNITED STATES PATENT OFFICE.

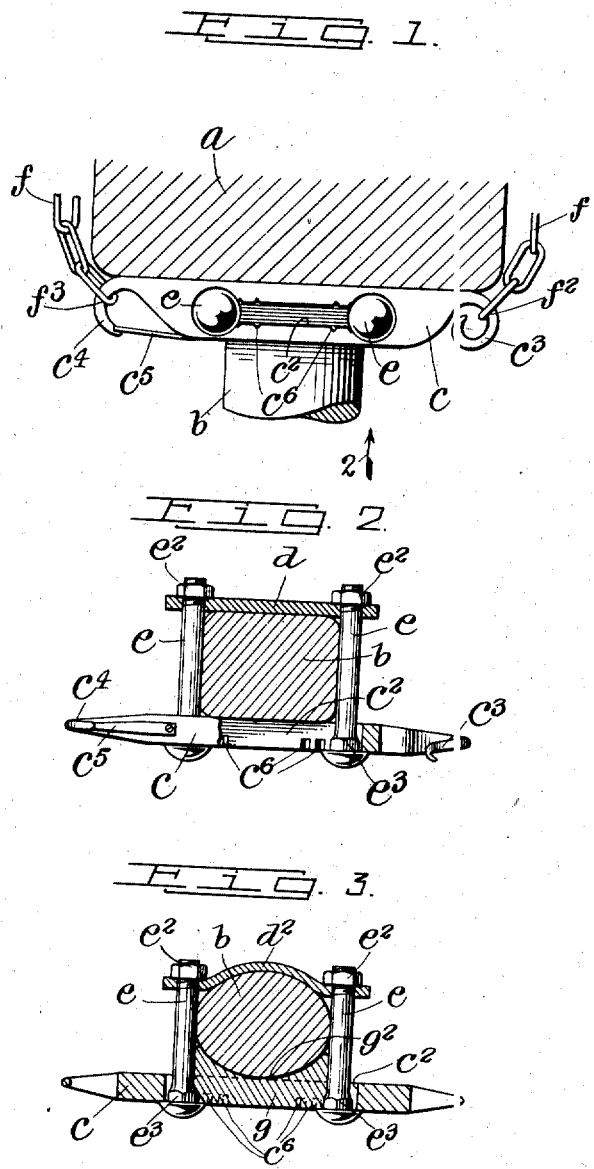

LUDWIG FRIEDRICH, OF NEW YORK, N. Y.

ANTISKIDDING ATTACHMENT FOR WHEELS.

1,216,104.  Specification of Letters Patent.  Patented Feb. 13, 1917.

Application filed January 19, 1916.  Serial No. 72,927.

*To all whom it may concern:*

Be it known that I, LUDWIG FRIEDRICH, a citizen of the United States, and residing at New York, in the county of New York and State of New York, have invented certain new and useful Improvements in Antiskidding Attachments for Wheels, of which the following is a specification, such as will enable those skilled in the art to which it appertains to make and use the same.

This invention relates to means for attaching antiskid devices to the wheels of power driven vehicles, and the object thereof is to provide improved devices of this class which are simple in construction and strong and durable in use and the application of which is simple and may be accomplished in a short time; and with this and other objects in view the invention consists in a device or devices of the class specified, constructed and applied as hereinafter described and claimed.

The invention is fully disclosed in the following specification, of which the accompanying drawing forms a part, in which the separate parts of my improvement are designated by suitable reference characters in each of the views, and in which:—

Figure 1 is a cross section of the rim portion of a wheel and showing my improvement applied to one of the spokes of the wheel;

Fig. 2 a cross sectional view of one of the spokes of a wheel and looking in the direction of the arrow 2 of Fig. 1 and showing the method of applying my improvement to the spoke; and, Fig. 3 a view similar to Fig. 2 but showing a modification.

In the drawing I have shown for illustration at $a$ a part of the rim of a wheel and at $b$ one of the spokes connected therewith and, in the practice of my invention, I provide a yoke piece $c$ having, in the form of construction shown, a central longitudinal slot $c^2$ and provided at one end with a circular hook member $c^3$ and at the other end with an ordinary snap hook $c^4$ having a spring snap device $c^5$.

In practice, the yoke piece $c$ is placed transversely on the inner surface of the rim $a$, as shown in Fig. 1, and adjacent to one of the spokes $b$, and a transverse plate $d$ is placed on the other side of said spoke, and bolts $e$ are passed through the slot $c^2$ and through the ends of the plate $d$ and provided with nuts $e^2$, and by means of this construction the yoke piece $c$ may be bound securely to the spoke adjacent to the rim portion of the wheel by providing a longitudinal slot in the yoke member $c$, said member is adapted for use in connection with spokes of various sizes within certain limits.

I also employ in connection with my improved attaching device the usual chain $f$, one end of which is adapted to be connected with the hook member $c^3$ of the yoke member $c$ as shown at $f^2$ and said chain is passed around the rim and tire or tread member which is not shown and connected with the snap hook $c^4$ as shown at $f^3$, and the device is ready for use, and while I have shown but one of my improvements applied it will be understood that any desired number thereof may be employed in connection with the spokes of a wheel.

The end portions of the bolts $e$ where they pass through the yoke member $c$ are provided with angular parts $e^3$, and the top and bottom walls of the slot $c^2$ are provided with angular recesses $c^6$ adapted to receive the angular portions $e^3$ of the bolts $e$, and by means of this construction the bolts are prevented from turning in the operation of applying the nuts $e^2$ and are also made adjustable toward and from the spoke.

The modification shown in Fig. 2 is the same in all respects as the construction in Figs. 1 and 2, except that the spoke $b$ is approximately round or elliptical in cross section, and for the straight plate $d$ shown in Fig. 2, I substituted a curved plate $d^2$ and a wedge block $g$ is placed in the slot $c^2$ and is held in position by the heads or head portions of the bolts $e$, and said block is provided in its inner edge portion with an arc-shaped recess $g^2$ in which the spoke closely fits.

The yoke member $c$, plates $d$ and $d^2$ and bolts $e$ may be made of any desired size so as to adapt the device to wheels or spokes of any size, and changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. An attaching device, comprising a yoke member and a plate member, said yoke member being provided with a longitudinal slot, bolts passed through said slot and said plate member for drawing the yoke and plate together, and said longitudinal slot being provided adjacent to the ends thereof and in the top and bottom walls thereof with a plurality of notches or recesses in which said bolts fit and by means of which the rotation of said bolts is prevented.

2. An attaching device, comprising a yoke member and a plate member, said yoke member being provided with a longitudinal slot, bolts passed through said slot and said plate member for drawing the yoke and plate together, said longitudinal slot being provided adjacent to the ends thereof and in the top and bottom walls thereof with a plurality of notches or recesses in which said bolts fit and by means of which the rotation of said bolts is prevented, and a block placed in said longitudinal slot and held therein by said bolts for preventing the movement of said yoke on the article to which said attaching device is secured.

In testimony that I claim the foregoing as my invention I have signed my name in presence of the subscribing witnesses this 17th day of January, 1916.

LUDWIG FRIEDRICH.

Witnesses:
C. MULREANY,
H. E. THOMPSON.